United States Patent [19]

Eisele

[11] Patent Number: 4,773,754
[45] Date of Patent: Sep. 27, 1988

[54] END-POINT OPTICAL TRACKER

[75] Inventor: Robert E. Eisele, Westminster, Calif.

[73] Assignee: Ford Motor Company, Dearborn, Mich.

[21] Appl. No.: 325,890

[22] Filed: Nov. 30, 1981

[51] Int. Cl.[4] .................. G01J 1/20; G01B 11/26; F41G 7/00
[52] U.S. Cl. .................. 356/152; 244/3.13; 244/3.16; 350/6.4; 350/6.9
[58] Field of Search .................. 356/141, 29, 152; 244/3.13, 3.16; 250/202, 203 R; 350/6.4, 6.9

[56] References Cited

U.S. PATENT DOCUMENTS

| | | | |
|---|---|---|---|
| 2,873,381 | 2/1959 | Lauroesch | 244/3.16 |
| 3,428,812 | 2/1969 | Burke | 250/203 R |
| 3,513,315 | 5/1970 | Sundstrom et al. | 250/203 R |
| 3,753,538 | 8/1973 | Marsh et al. | 244/3.16 |
| 3,762,819 | 10/1973 | Myer | 356/152 |
| 3,790,276 | 2/1974 | Cook et al. | 356/152 |
| 3,954,340 | 5/1976 | Blomqvist et al. | 356/152 |
| 3,956,627 | 5/1976 | Kikuchi et al. | 250/209 |
| 3,974,383 | 8/1976 | Chapman | 250/342 |
| 4,006,356 | 2/1977 | Johnson et al. | 250/203 |
| 4,193,688 | 3/1980 | Watkins | 356/152 |

Primary Examiner—Stephen C. Buczinski
Attorney, Agent, or Firm—Paul K. Godwin, Jr.; Clifford L. Sadler

[57] ABSTRACT

An optical tracker for automatically following a designated end-point of an elongated target, such as the nose of a missile, by orienting the received image to align with a predetermined reference and nutating the image over orthogonal detectors to detect an alignment error between the end-point of the target and the optical axis of the optical system. Orientation alignment errors are corrected by appropriately rotating an image rotating optical element about the optical axis, while the optical axis alignment errors are corrected by responsively redirecting the optical system until detected errors are minimal.

12 Claims, 2 Drawing Sheets

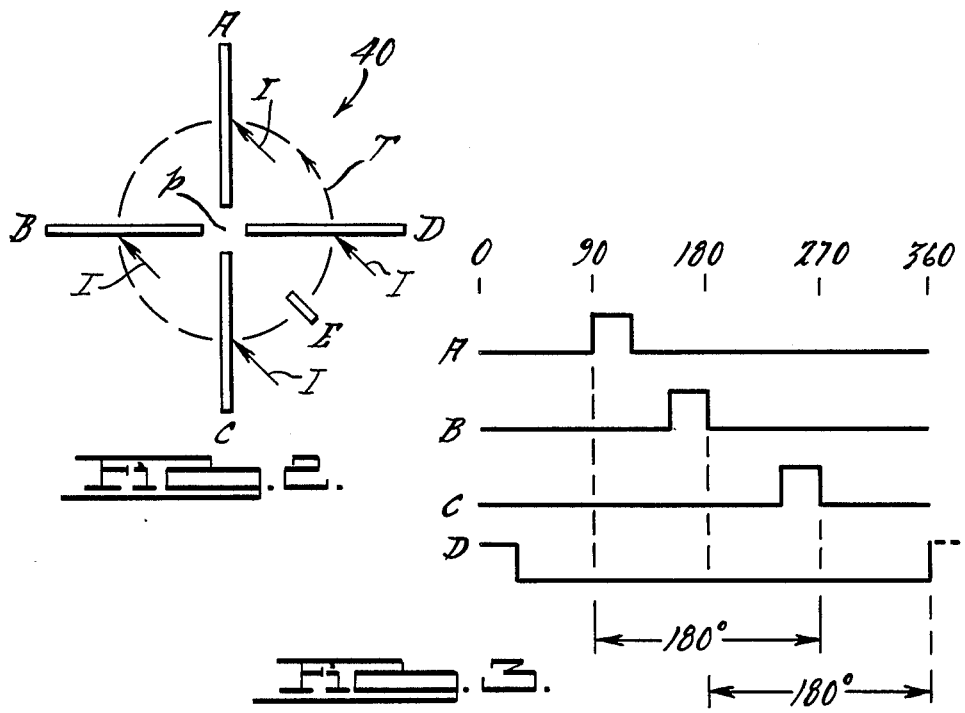
FIG. 2.
FIG. 3.
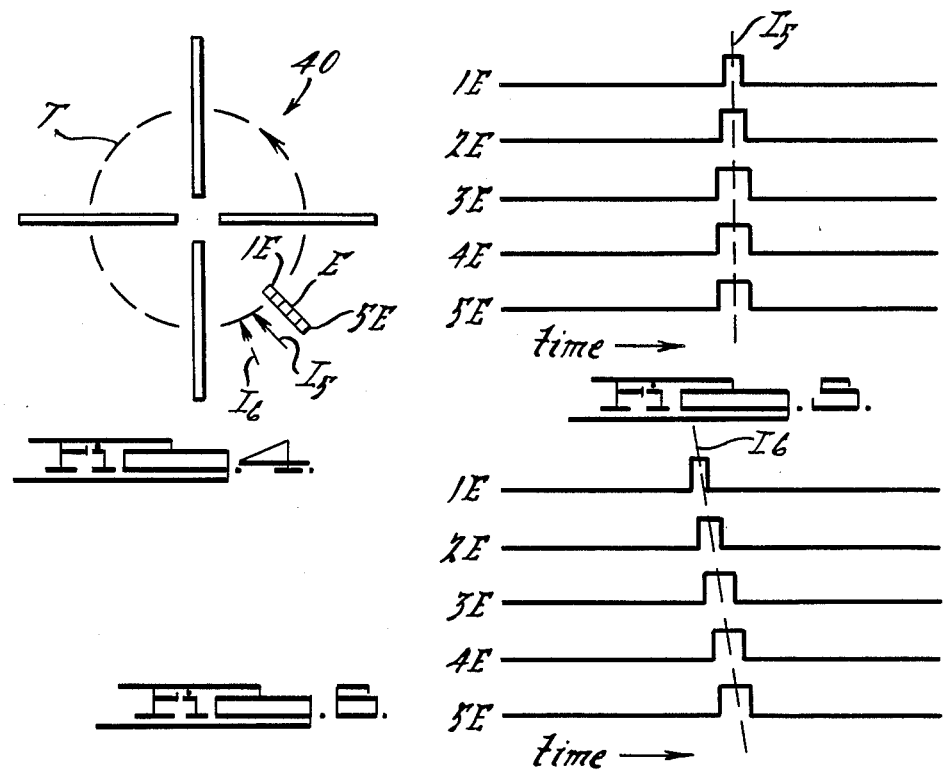
FIG. 4.
FIG. 5.
FIG. 6.

END-POINT OPTICAL TRACKER

BACKGROUND OF THE INVENTION

1. Field of the Invention

The present invention is directed to the field of optical tracking systems and more specifically to the area of designated point tracking of specifically characterized targets.

2. Description of the Prior Art

The remote tracking of designated targets is discussed in commonly assigned U.S. Pat. No. 4,006,356. That patent utilizes a technique by which an infrared target image is projected onto a plurality of detectors and circularly nutated. By comparing the length of time that each detector outputs a signal attributed to the nutating image, error signals may be developed and the tracker optics can be responsively redirected to track the target along the optical axis line of sight.

Such prior art trackers are adequate for followig point sources of radiant energy, such as the infrared radiation emitted by the engine of a missile or aircraft. However, in more advanced weapon system applications in which high intensity energy is employed to disable and destroy missiles in flight, the energy must be precisely directed to the central control system of a missile in order to be efficiently destructive. The prior art trackers are not constructed to achieve the degree of precision required for such an application.

SUMMARY OF THE INVENTION

The present invention overcomes the deficiencies of the prior art by providing both method and apparatus for tracking a predetermined end-point of an elongated target, such as the nose of a missile. The invention reorients the received image of the target so that it is focused onto an array of orientation detectors in a prescribed manner. Correction signals are generated by the orientation detectors to maintain the image orientation throughout tracking, no matter how the actual target is oriented with respect to the system. The reoriented target image is also nutated over a set of alignment detectors so that leading and trailing edges of detector signals correspond to the predetermined end-point of the target image and provide precise timing signals to determine errors present in aligning the tracker optics with the predetermined end-point.

It is, therefore, an object of the present invention to provide an automatic tracking system that orients a received image of an elongated target upon acquisition and redirects the optical axis of the associated tracking telescope to intercept a predetermined end-point of the target.

It is another object of the present invention to provide a system by which the elongated target is profiled by sweeping its image laterally over a linear array of detectors and generating an orientation error signal by comparing the occurrence pattern of the midpoint of the signals from each detector in the array with a predetermined orientation occurrence pattern, thereby determining a degree of image misorientation.

It is a further object of the present invention to provide a means for monitoring the orientation error signal and responsively reorienting the image until the error signal is at a minimum.

It is still another object of the present invention to provide a system by which the nose of a missile can be accurately tracked so that the line of sight of the tracker continually intercepts the nose and provides directional information to an associated weapon system.

BRIEF DESCRIPTION OF THE DRAWINGS

FIG. 2 illustrates the alignment detector arrangement and nutation of an aligned image over those detectors.

FIG. 3 is a set of waveforms corresponding to the output signals provided by the detectors shown in FIG. 2.

FIG. 4 illustrates an image orientation detector array disposed with respect to the alignment detectors shown in FIG. 2.

FIG. 5 is a set of waveforms corresponding to the output signals from the image orientation detectors as they sense the precisely oriented image $I_5$ shown in FIG. 4.

FIG. 6 is a set of waveforms corresponding to the output signals from the image orientation detectors as they sense the misoriented image $I_6$ shown in FIG. 4.

DETAILED DESCRIPTION OF THE PREFERRED EMBODIMENT

Figure 1:
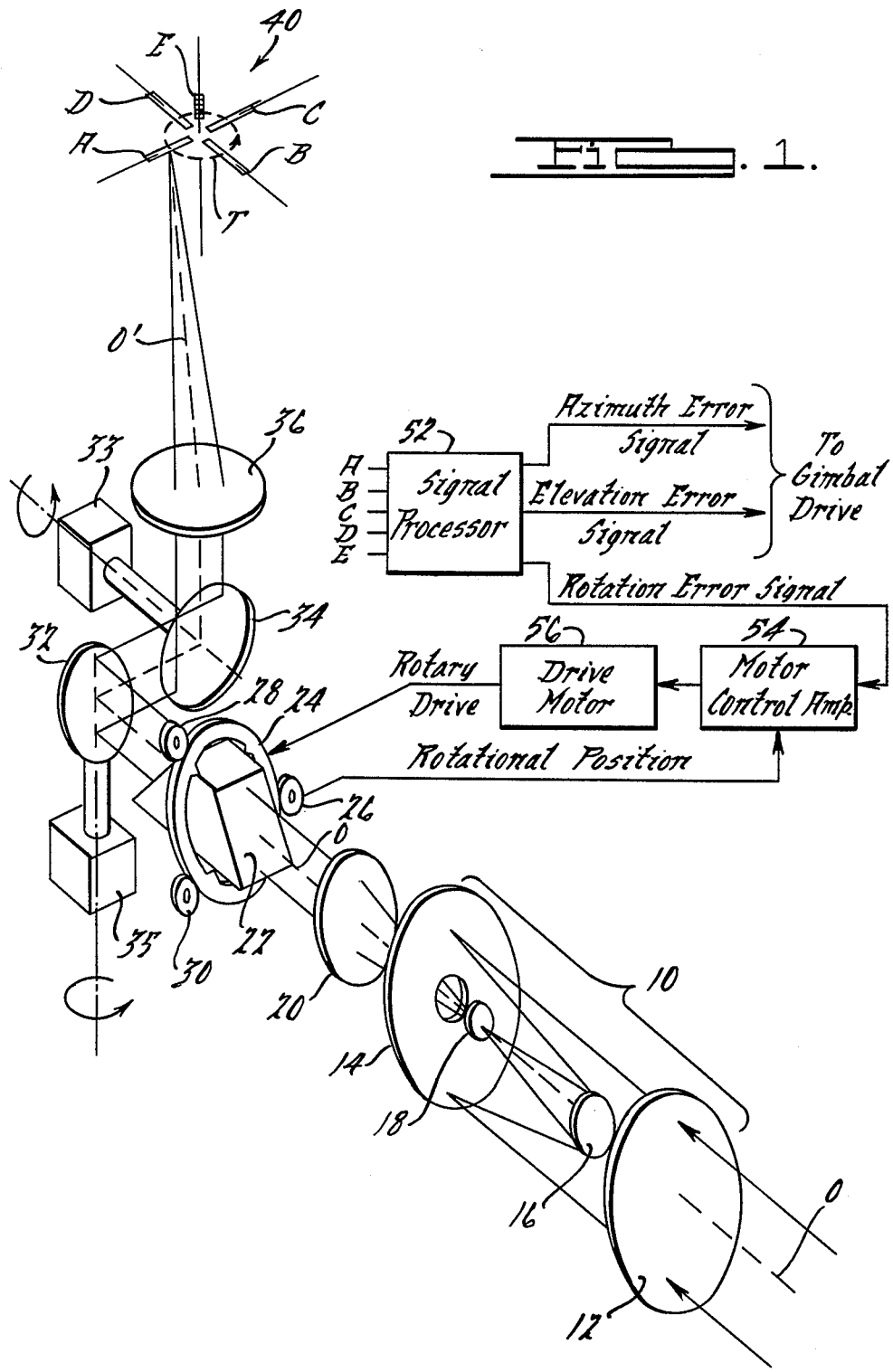
FIG. 1 is a schematic diagram of the optical system that embodies the present invention.

Precisely tracking a designated point, such as the nose, tail or some end referenced point of a missile, is critical in weapons systems which utilize high energy beams to disable the tracking system of such an incoming missile. Moreover, it may be necessary to accurately determine the profile of each missile in order to know the precise aim point for that corresponding missile type.

The present invention includes a telescope which is controlled, either through conventional gimbaled means or via auxiliary steering mirrors, so that its field of view and line of sight optical axis may be directed towards a designated target and to align with a predetermined aim point on that target.

In order to insure that the designated end-point on the missile is tracked, no matter what aspect the actual target has with respect to this telescope, it is necessary to present the target image in a predetermined orientation reference to an orientation detector. Therefore, image rotation is performed within the telescope and the proper orientation of the image is maintained.

During acquisition of the target and tracking, the received images are nutated over a set of detectors, in the focal plane of the telescope. By knowing the direction of nutation, it is then possible to monitor and compare signals generated by alignment detectors to control the telescope directors so that the line of sight optical axis of the telescope intercepts the designated end-point of the elongated target. In the remaining discussion, it will be assumed that the desingated end-point for the elongated target is the nose of a missile.

The apparatus embodying the present invention is shown in FIG. 1 and includes a telescope defining an optical axis 0. A reflective objective lens system 10 defines a field of view for the telescope along the optical axis 0. The reflective objective 10 includes a corrector lens 12, a primary mirror 14, a secondary mirror 16 and a field lens 18. The corrector lens 12 focuses the image onto the field lens 18 after being reflected by the primary mirror 14 and the secondary mirror 16. The field lens 18 projects the image through a central aperture in the primary mirror 14 and a first relay lens 20. The first relay lens 20 collimates the incoming radiant energy;

and the collimated energy is transmitted through an image rotating means such as a Dove prism 22 mounted for rotation along the optical axis 0.

The mounting means for the Dove prism 22 is shown as a support ring 24 mounted on rollers 26, 28 and 30. The mounting ring 24 is mechanically connected to a drive motor which is precisely controlled through a feedback arrangement to rotate the Dove prism 22 and achieve the precise image orientation required. The optical axis, as well as the entire field of view, is nutated in a circular scan over the focal plane defined by a second relay lens 36. The nutation is shown in the preferred embodiment as utilizing galvonometer mirrors 32 and 34 rotationally driven along orthogonal axes at the same frequency by respective galvonometric drive motors 35 and 33. When the mirrors are driven at the same frequency, the optical axis 0' is conically scanned (nutated) to trace a circle T on the focal plane. Therefore, a target image received by the telescope is also scanned over a circle on the focal plane, although not necessarily the same circle as traced by the nutated optical axis 0'.

The apparatus shown in FIG. 1 includes an exemplary array of detectors 40, individually designated as alignment detectors A, B, C, D and orientation detector array E disposed on the focal plane of the telescope. The outputs of the individual detectors are fed to a signal processor 52 which decodes the signals generated in response to the nutated images to provide azimuth error signals, elevation error signals and image rotation error signals. The azimuth and elevation error signals are fed to a gimbal drive unit (not shown), of a conventional type, which is used to reorient the telescope. The image rotation error signals are fed to a motor control amplifier 54, which controls the drive motor 56 for rotating the Dove prism 22. A rotational position monitor is connected to roller 26 to provide positional information that is fed back to the motor control amplifier 54. The concept for signal processing of the detected images is discussed with respect to FIGS. 2-6.

The detector array 40, shown in FIG. 2, and the associated waveforms, shown in FIG. 3, indicate the occurrence of a properly oriented target image I (in the form of an arrow) as it is nutated so that the nose of the image I is nutated with the optical axis 0' over a circle T. The alignment detectors A, B, C and D are in a cruciform arrangement, wherein detector pairs A and C as well as B and D are each linearly aligned so that linear extensions of corresponding pairs are orthogonal and intersect at the center of nutation p.

It has been determined by the inventor that a properly oriented image I will have an aspect of 45° with respect to the orthogonal extensions of the alignment detectors. Therefore, the image orientation linear array of detectors E is disposed along a line having a linear extension that bisects the orthogonal extensions at the nutation center p. The function of the linear array of detectors E is discussed with respect to FIGS. 4, 5 and 6.

When a properly oriented image I is nutated over the alignment detectors, the leading edge of the signal generated from detector A is coincident with the nose end-point of the image I. Similarly, by knowing that the image is being swept in a counter-clockwise direction, the trailing edge of the signal generated at the B detector will be coincident with the nose end-point of the image I; the trailing edge of the signal generated by the C detector is coincident with the nose end-point of the image I; and the leading edge of the signal generated by the detector D is coincident with the nose end-point of the image I. Accordingly, the signal processor 52 compares the time intervals between, for instance, the occurrence of the leading edge of the signal generated by the A detector and the occurrence of the trailing edge of the signal generated by the C detector with the time interval between the occurrence of the trailing edge of the signal generated by the B detector and the occurrence of the leading edge of the signal generated by the D detector. Such a comparison determines errors in alignment of the telescope line of sight optical axis and that error appears as an off-center nutation of the image I. In the example shown in FIGS. 2 and 3, the nose end-point of the image is properly aligned with the optical axis since both the optical axis and nose of the image I are nutated over the circle T. In addition, the compared time intervals are exactly equal for each 180° of nutation. If the centroid of the nutation of the image is off due to tracking error, the time intervals will differ and appropriate error signals will be generated to the directing means of the telescope so that the directing means may responsively correct the track.

While the cruciform arrangement of detectors 40 is preferred in this embodiment, it should be understood that a more inexpensive detector arrangement of only two linear detectors, such as for example C and D, could be utilized to determine centroid tracking. However, the inventor feels that the cruciform arrangement of detectors provides the opportunity for a more precise measure. Therefore, it is shown in the preferred embodiment.

FIGS. 4, 5 and 6 illustrate the technique employed to detect the aspect orientation of the image and provide error signals to reorient the image through the image rotation means. In FIG. 4, the linear array of orientation detectors E is shown to be five in number and indicated as $1_E$–$5_E$. An image of the missile target, in proper orientation so that its length dimension is parallel to the length dimension of the linear array E, is indicated as $I_5$. The corresponding waveform output from the array of detectors E is shown in FIG. 5, as the image is nutated over the linear array of orientation detectors. In the case of image $I_5$, the signals from the five detector elements illustrate the profile of the image $I_5$. Therefore, in the case of a missile having a very narrow nose area as compared to progressively broader sections along the length thereof, the signals would appropriately show the profile. A larger number of detectors in the orientation array would, of course, increase the resolution.

In order to determine whether the image is properly oriented, it is necesary to monitor each signal and determine the occurrence of the midpoint of the signal. When the midpoint of each signal occurs simultaneously, as shown in FIG. 5, the error signal generated by the signal processor is minimal and indicates that the image is properly oriented. However, in the case of the image $I_6$, which is shown as slightly misoriented in FIG. 4, the signals derived from the orientation detectors E are shown in FIG. 6; and the midpoints of each of the signals occur in a time sequence indicating that the image $I_6$ is slightly misoriented. Therefore, through appropriate programming, the signal processor 52 can determine the degree and direction of misorientation and accordingly generate error signals that command the Dove prism 22 to rotate in the appropriate direction to correct the image orientation.

It will be apparent that many modifications and variations may be implemented without departing from the scope of the novel concept of this invention. Therefore, it is intended by the appended claims to cover all such modifications and variations which fall within the true spirit and scope of the invention.

I claim:

1. In a system for tracking a designated end of an elongated target the combination of:
   a telescope means defining a field of view, an optical axis and a focal plane;
   means within said telescope for optically rotating the received images of said elongated target about the optical axis;
   means along the optical axis of said telescope for nutating said optical axis and the received images within said defined field of view over circular paths on said defined focal plane;
   means located at the defined focal plane for sensing the nutation and rotational orientation of said images and including a linear array of orientation detectors disposed to detect the rotated image as it is nutated by said nutating means;
   means connected to said sensing means for producing image orientation error signals indicative of the degree of parallel misalignment between the length dimension of the rotated received image of the elongated target and the length dimension of said linear array;
   means responsive to said orientation error signals for continuously correcting said image rotating means to maintain said orientation error signals at a minimum; and
   means connected to said sensing means for determining errors in co-axial alignment between said defined optical axis of said telescope and a line defined from said telescope to a designated end point on said elongated target and responsively generating appropriate alignment error signals.

2. The combination as in claim 1, wherein said sensing means further includes orthogonally oriented alignment detectors on said defined focal plane so that linear extensions from said orthogonally oriented alignment detectors intersect at the nutating center of the optical axis.

3. The combination as in claim 2, wherein said linear array of orientation detectors is disposed on said defined focal plane so that a linear extension from said array intersects said nutating center of the optical axis and bisects the intersection angle of the orthogonal linear extensions.

4. The combination as in claim 3, wherein said orthogonally oriented alignment detectors include two pair of detectors diametrically disposed across the nutating center of said optical axis.

5. The combination as in claim 4, wherein said sending means is operative to sense images in the visible region of the optical spectrum and said means for optically rotating said images includes a Dove prism disposed along the optical axis of said telescope.

6. The combination as in claim 5, wherein said Dove prism is mounted for rotation about the defined optical axis and said responsive correcting means includes means connected to responsively rotate said Dove prism.

7. In a method for automatically directing the optical axis line of sight of a telescope towards a designated end point of an elongated target the combination of steps of:
   nutating the optical axis and received images within the field of view of the telescope over corresponding circular paths projected onto the focal plane of the telescope;
   providing a linear array of orientation detectors at the focal plane of said telescope to receive said nutated image;
   rotating the received image of said elongated target until the image of said elongated target is aligned parallel with said orientation detectors as it is nutated over said array; and
   detecting the degree of misalignemnt of the nutated optical axis with the nutated designated end point of the received elongated target image.

8. The combination of steps as in claim 7, further including the steps of:
   providing alignment detectors at the focal plane of said telescope to receive said nutated image and disposing said alignment detectors so that linear extensions of said respective detectors intersect and form a right angle that is bisected by a linear extension of said linear array of orientation detectors.

9. The combination of steps as in claim 8, wherein said step of detecting the degree of misalignment is performed by:
   monitoring the output signals of said alignment detectors as said designated end point of said elongated image is nutated and comparing the occurrences of the alignment detector output signals that correspond to the designated end-point.

10. The combination of steps as in claim 9, wherein said step of rotating said image is performed by providing an image rotating optical element along the optical axis of said telescope and providing a means for controlling the amount of image rotation provided by said image rotating optical element.

11. The combination of steps as in claim 10, wherein said step of rotating said image further includes the step of monitoring the output signals from said linear array of orientation detectors;
   comparing the occurrence pattern of the midpoint of said output signals with a predetermined alignment occurrence pattern to thereby determine the degree of misalignment; and
   directing said controlling means to appropriately rotate said image until the occurrence pattern of said output signals corresponds to the predetermined alignment occurrence pattern.

12. The combination of steps as in claim 11, wherein said step of providing an image rotating optical element is performed by providing a Dove prism disposed along said optical axis for physical rotation about said axis

* * * * *